United States Patent
Cope et al.

(10) Patent No.: US 8,819,243 B1
(45) Date of Patent: Aug. 26, 2014

(54) DELIVERING CONTENT TO MOBILE CLIENTS

(75) Inventors: Warren B. Cope, Olathe, KS (US); Von K. McConnell, Leawood, KS (US); Douglas A. Olding, Overland Park, KS (US); Arun Santharam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1294 days.

(21) Appl. No.: 11/751,281

(22) Filed: May 21, 2007

(51) Int. Cl.
*G06F 15/16* (2006.01)

(52) U.S. Cl.
USPC .......................................................... 709/227

(58) Field of Classification Search
USPC .......................................................... 709/227
See application file for complete search history.

(56) References Cited

U.S. PATENT DOCUMENTS

| | | | |
|---|---|---|---|
| 2001/0031635 A1* | 10/2001 | Bharatia | 455/432 |
| 2003/0050062 A1* | 3/2003 | Chen et al. | 455/435 |
| 2004/0266388 A1* | 12/2004 | Maes | 455/403 |
| 2007/0067249 A1* | 3/2007 | Chatte | 705/410 |
| 2007/0079383 A1* | 4/2007 | Gopalakrishnan | 726/26 |
| 2007/0297430 A1* | 12/2007 | Nykanen et al. | 370/408 |
| 2008/0005668 A1* | 1/2008 | Mavinkurve et al. | 715/526 |

OTHER PUBLICATIONS

Armando Fox et al., "Adapting to Network and Client Variability via On-Demand Dynamic Distillation," pp. 1-11, UC Berkeley.
Brian D. Noble, et al., "Agile Application-Aware Adaptation for Mobility," 12 pp., Proceedings of the 16th ACM Symposium on Operating System Principles.
Terri Watson, "Application Design for Wireless Computing," 4 pp., Department of Computer Science & Engineering, Univ. of Wash., Seattle, WA, Sponsored by Presidential Young Investigator Award from National Science Foundation, with matching funds from the Xerox Corporation.
Jin Jing et al., "Client-Server Computing in Mobile Environments," ACM Computing Surveys, Jun. 1999, pp. 117-157, vol. 31, No. 2.
Printout of Google Destop website, date downloaded: May 15, 2007.

* cited by examiner

Primary Examiner — William Goodchild

(57) ABSTRACT

A delivery system, media, and method for communicating content to devices are provided. The delivery system includes a services aggregator and content aggregator for processing requests from the devices. The services aggregator processes the request to identify credentials for the devices that generate the request and to identify providers of content specified in the request. The content aggregator receives the content from the identified providers and formats the content based on limits imposed by the device. Because the devices are configured to allow the services aggregator and content aggregator to perform computational-intensive tasks associated with requesting and transmitting the content, the complexity and cost of the devices are minimized.

11 Claims, 4 Drawing Sheets

DELIVERING CONTENT TO MOBILE CLIENTS

INTRODUCTION

Conventional devices access services using dedicated resources created in the devices. The dedicated resources are replicated for each conventional device and for each operating system running on the conventional device. For instance, the dedicated resources may include data applications, which must be reprogrammed for each conventional device having a different manufacturer that provides a proprietary architecture or operating system. For each conventional device, the data applications for displaying data, for communicating on a communication network, and for running other services associated with the data applications must be reprogrammed. This reprogramming is necessary because of proprietary operating systems or architectures designed by manufacturers of each conventional device. Accordingly, producing additional services for the conventional devices having different manufactures incurs large amounts of development costs because the dedicated resources must be created and tested for each conventional device and its corresponding proprietary architecture or operating system.

Furthermore, physical limitations of the conventional devices may hinder development of additional services. The physical limitations of the conventional devices may limit processing and communication abilities of the conventional devices. The additional services may be prohibited because the conventional devices are not equipped to process requests and communicate with other devices in a timely manner.

Thus, a need arises for efficiently providing current services and additional services to devices, while minimizing costs associated with developing the additional services and executing the current services and additional services.

SUMMARY

The present invention is defined by the claims below. Embodiments of the present invention solve at least the above problems by providing content delivery systems, media, and methods for, among other things, delivering content to devices over a communication network. The present invention has several practical applications in the technical arts including, but not limited to, efficiently delivering content to devices that are unaware of the applications or services associated with the content, dynamically modifying key mappings on devices based on the content received by the devices, and combining content for delivery to the devices over the communication network.

In a first aspect, a set of computer-useable instructions request content over a communication network. A device renders content in response to a previous request. The device associates the rendered content with a first key mapping. In turn, the device transmits a subsequent request for additional content. Upon receiving the additional content, the device generates additional key mappings for the additional content. The device simultaneously displays the content rendered in response to the previous request and the additional content. The device interacts with the content rendered in response to the previous request and the additional content via the first key mapping and additional key mappings.

In a second aspect, a set of computer-useable instructions deliver content over the communication network. A request for content is generated by a requestor. The request for content is received over the communication network. The request for content is processed to identify the services and providers associated with the content. A session is initiated with the providers based on an access level associated with the requestor. The content is obtained from the identified providers. In turn, the content is transformed into a viewable format and transmitted over the communication network to the requestor.

In a third aspect, a distributed delivery system—having devices, a services aggregator, and a content aggregator—delivers content to the devices based on requests received from the devices. The devices generate requests for the content. In turn, the services aggregator and content aggregator process the requests and transmit content specified in the requests to the devices for display. The services aggregator identifies credentials associated with the devices, identifies providers of the content and services associated with devices, and generates sessions with the identified providers. The credentials may be a profile that includes username, passwords, device type, and device constraints. The content aggregator receives content from the providers and transforms the content for display based on the device constraints.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide content delivery systems, media, and methods for devices, i.e., mobile phones, gateways, modems, personal digital assistants (PDAs), and personal media players, which receive content by interacting with a services aggregator and content aggregator on a communication network. The devices employ the services aggregator and content aggregator located on the communication network to receive content. The services aggregator and content aggregator, rather than applications programmed on the device, provide content control. The design of the device is simplified because implementation of content and service applications are moved, from each device, to the communication network. The benefits of the content delivery system include, among other things, simpler devices that allow the services aggregator and content aggregator provided by the communication network to perform computational-intensive tasks associated with delivering content and providing the services associated with the delivered content.

The simpler devices include a minimum amount of intelligence required to provide browser-like access to the content available on the communication network. In some embodiments, the communication network is a WIMAX network that is governed by the formal specification outlined in (Institute of Electrical and Electronics Engineers) IEEE 802.16. All services may be provided by the services aggregator and content aggregator located on the communication network. Development costs are moved from the simpler device onto the communication network. Thus, additional services may be provided by the communication network without having to reprogram and test the simpler devices and without increasing costs of the simpler devices.

Computer-readable media, which is non-transitory in nature, includes both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Embodiments of the present invention provide a content delivery system that employs a services aggregator and a content aggregator to respond to requests from devices communicatively connected to the communication network. The services aggregator processes the requests and communicates with one or more providers to obtain content specified in the requests. In turn, the services aggregator communicates with the content aggregator to format the content for delivery to the devices over the communication network.

Figure 1:
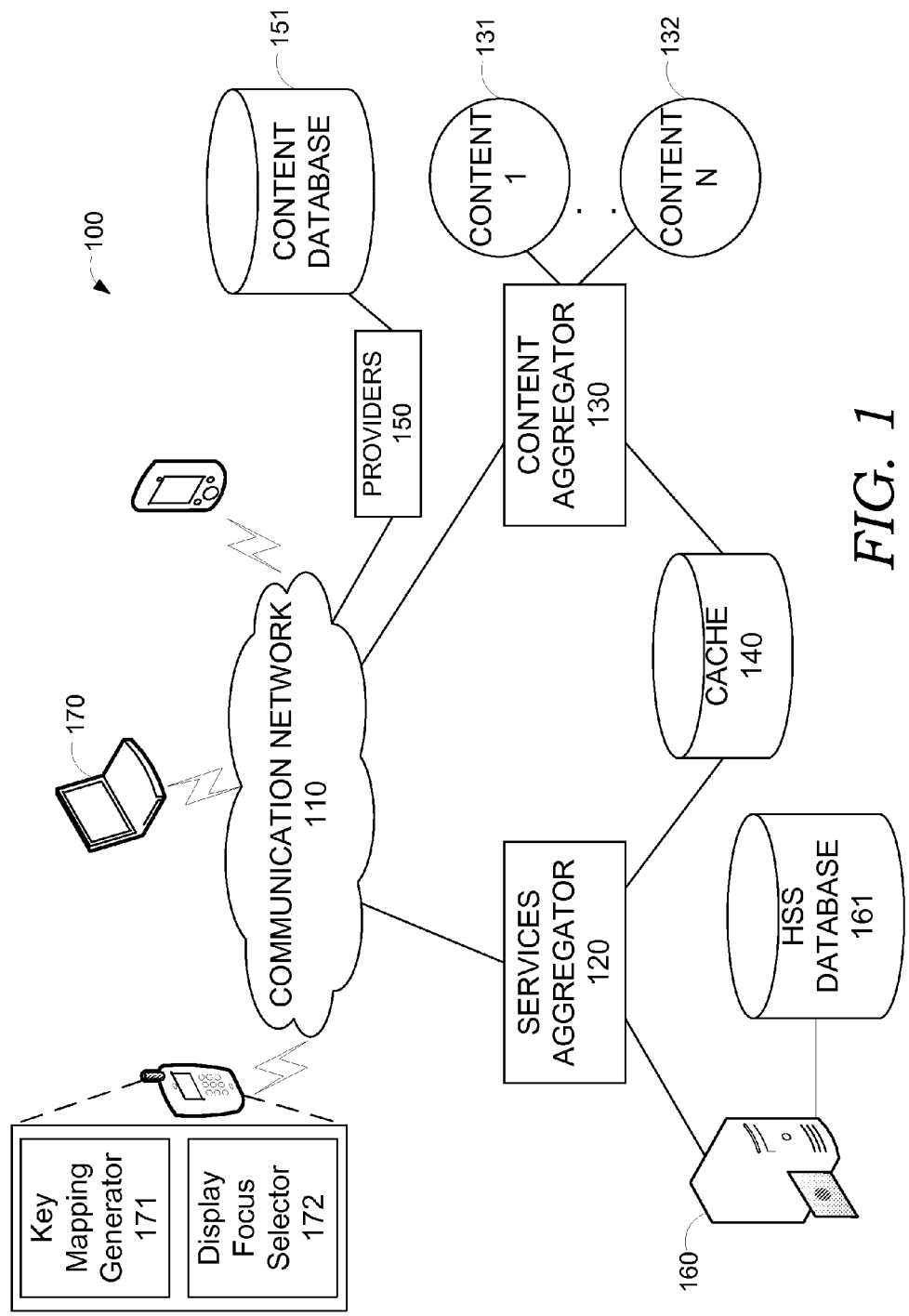
FIG. 1 is a network diagram that illustrates an exemplary operating environment, according to an embodiment of the present invention.

FIG. 1 is a network diagram that illustrates an exemplary operating environment 100, according to an embodiment of the present invention. The operating environment 100 includes, but is not limited to, a communication network 110, services aggregator 120, content aggregator 130, cache 140, providers 150, home serving system (HSS) 160, and devices 170.

The communication network 110 may be a WIMAX enabled wireless network. In some embodiments, the communication network 110 is configured as an internet protocol (IP) packet network. The communication network 110 provides access to services corresponding to requests generated by the device 170. Also, the communication network 110 provides control and signaling required to complete the requests generated by the device 170. The functionally for the communication network 110 is provided by the services aggregator 120 and the content aggregator 130. The services aggregator 120 and content aggregator 130 are utilized to scale content based upon, among other things, load conditions of the communication network 110 and a service level agreement associated with device 170. In certain embodiments, the services aggregator 120 and content aggregator 130 provide the device 170 with the necessary display rendering and keypad control programming for displaying and interacting with the content requested by the device 170. The operating environment 100 leverages the communication network's 110 high speed bandwidth to communicate with services aggregator 120 and content aggregator 130 that implement services, whose customized programming were removed from the device 170 to reduce the cost and complexity of the device 170. In addition, the communication network 110 is employed to provide additional services, i.e., electronic shopping, video-on-demand, user navigation, while maintaining legacy services, i.e., email and messaging for the device 170. The additional services are next-generation services that are offered on the WIMAX network through the services aggregator 120 and content aggregator 130. The legacy services are services that were traditionally preprogrammed into a legacy device.

The services aggregator 120 is configured to provide legacy services and additional services to the device 170. The services provided by the services aggregator 120 include, but are not limited to, calendar and date functions, e-mail, video downloads, video playing, trip planning, instant messaging, short messaging system (SMS) messaging, and other data services. Because the services aggregator 120 provides both next-generation services and legacy services, device 170 may receive the legacy services without having the source or object code associated with the legacy services. Instead, the services aggregator 120 receives requests from the device 170 and processes the requests to provide the device 170 with the appropriate content and services. Based on the requests, the services aggregator 120 determines which services the device 170 requires. In turn, the services aggregator 120 polls the HSS 160 to obtain credentials for the device 170 making the request. The credentials provided by the HSS 160 specify data that corresponds to the device 170 and data about the content and service. For instance, the credentials may identify the following: types of content that device 170 is authorized to receive; types of services that device 170 is authorized to receive; display limits and other constraints associated with the device 170; and authorized providers 150 for the device 170. The services aggregator 120 may store the credentials in the cache 140 to process subsequent requests for the device 170 without polling the HSS 160. In some embodiments, the credentials include username, password, protocol, and screen resolution of the device 170, and a display size of the device 170. Based on the credentials associated with the device 170, the services aggregator 120 opens a communication session with, and formats a query to, the authorized providers 150 of the content and services for the device 170. In turn, the services aggregator 120 receives the content from the authorized providers 150 and examines the content requested by the device 170 to determine the appropriate scale and positioning of the content. For instance, upon receiving an email request from the device 170, the services aggregator 120 communicates with the HSS 160 or checks cache 140 to locate credentials for the device 170 and to locate an email server for the device 170. The services aggregator 120 formulates a request to the email server based on the credentials associated with device to receive emails, attachments, and other notifications for the device 170. In certain embodiments, the services aggregator 120 determines the appropriate scale and positioning of the content by monitoring a current communication session with the device 170, to identify the content the device is currently receiving. Based on the current content being sent to device 170, the services aggregator 120 calculates the scale and position of all content to be received by the device 170. The content and the appropriate scale and positioning of all the content is sent from the services aggregator 120 to the content aggregator 130 for further processing. For instance, the service aggregator 120 may partition a display area for the device 170 to receive two simultaneous feeds of content representing disparate types of content. The service aggregator 120 may request the device 170 to open a new communication session with the content aggregator 130 to receive the processed content—any combination of e-mail, images, video, or voice. Additionally, the services aggregator 120 may trigger device 170 to generate key mappings based on the processed content sent from the content aggregator 130. The device 170 can switch between types of content included in the processed content via the key mappings.

The content aggregator 130 processes content for delivery to device 170. In an embodiment, the content aggregator 130 receives the content, position, and scale information from the services aggregator 120. In turn, the content aggregator 130 processes the content to allow rendering of all the content received from the services aggregator 120. The content aggregator 130 may utilize rules to determine the best combination of content to format for delivery to device 170. The rules may allow or disallow certain combinations of content. For instance, the rules may allow video and email, or e-mail and voice. In another embodiment, the content aggregator 130 may request new versions of content from the authorized providers 150 based on the position and scale information received from the services aggregator 120 rather than perform transformation on the content directly. For instance, the content aggregator 130 may convert and stream video received from the service aggregator 120 to the device 170 at a resolution and frame rate supported by the device 170, or the content aggregator 130 may query the authorized providers for new versions of content that satisfy a frame rate and resolution of the device 170, and the size, scale, and position, constraints determined by the services aggregator 120. When the content aggregator 130 receives new content during a current communication session that provides content to device 170 in response to a previous request, the content aggregator 130 continues transmitting the previously requested, including content buffered in cache 140, until the content aggregator 130 produces a combination of the previously requested content and the new content. In certain embodiments, the combination of the previously requested content and the new content is sent to the device 170 during a new communication session opened by the service aggregator 120. The content aggregator 130 may receive requests, from the service aggregator 120, to update the content based on requests for additional content received from the device 170. For instance, the updates may include stopping transmission of combined content to device 170, resizing the content, and obtaining additional portions or segments of the content.

For instance, the content aggregator 130 may request additional video from the authorized providers 150. The content aggregator 130 may generate requests for versions of the content having different resolutions, sizes, or frame rates based on the content currently received by the device 170. In alternate embodiments, the content aggregator 130 may directly transform the content to reduce the size, resolution, or frame-rate of the content received from the service aggregator. In some embodiments, the new size of the content is determined by the services aggregator 120 based on, among other things, the service level agreement associated with the device 170, bandwidth conditions on the communication network 110, and the content currently rendered on the device 170. The content aggregator 130 receives the new size from the services aggregator 120 and uses the new size to directly transform the content. After the content aggregator 130 transforms the content, it may perform reduction operations, such as zigzag compression on the content. Alternatively, the content aggregator 130 may request the authorized provider 150 for versions of content that meet the conditions, i.e., new size, determined by the service aggregator 130.

In certain embodiments, the content aggregator 130 may simultaneously process email and video content for rendering on the device 170. The content aggregator 130 may combine images associated with email and video content and transmit the combined images to the device 170. The content aggregator 130 may cache versions of the content received from the authorized providers 150 or produced by the content aggregator 130 in cache 140. The cache 140 may store content 131 and 132, which represent different resolutions or sizes of the content 131 and 132 available to the content aggregator 130. In an embodiments, the content aggregator 130 may access the cached content 131 and 132 based on the requests of the device 170. The cache 140 is connected to services aggregator 120 and content aggregator 130. The cache 140 stores credentials associated with the device 170. Also, the cache 140 stores versions of content 131 and 132 received by, or produced by, the content aggregator 130. The cache 140 is utilized by the services aggregator 120 and content aggregator 130 to obtain the stored credentials and versions of the content 131 and 132, when processing a request from device 170.

The providers 150 transmit content to the services aggregator 120 or the content aggregator 130. Each provider 150 is connected to a content database 151, which stores content associated with a type of content corresponding to services provided by the services aggregator 120. The services aggregator 120 may receive content from the providers 150 in response to a request by the device 170 that uses the services provided by the services aggregator 120. The content database 151 may store email, video, music, or image content. Moreover, the providers 150 may transmit additional content to the content aggregator 130 based on requests received from the content aggregator 130 for new content or different versions of the content 131 and 132.

The HSS 160 is a home serving system that provides credential information to the services aggregator 120. The HSS 160 is connected to the HSS database 161, which stores credential information for each device 170 or user. The HSS database 161 may include records that represent profiles, passwords, device constraints, service identifiers (IDs) for each service a user of the device 170 has remitted payment for, and service levels for each device 170. The HSS database 161 may store provider locations and formatting information for the content. The HSS 160 responds to requests from the services aggregator 120 with results that include, among other things, the location of one or more providers 150 and credentials for the device 170 that initiated the request.

The device 170 generates requests for content, transmits the requests to the services aggregator 120 for processing, and displays content received from the content aggregator 130. The device 170 communicates with the services aggregator 120 to obtain content associated with a collection of services that the device 170 is configured and authorized to receive. The services may include e-mail, video, messaging, voice, and other legacy services or next-generation services. The device 170 may be a portable media player, a personal digital assistant, a laptop or a mobile phone. Because the content aggregator 130 and services aggregator 120 provide functions for implementing the services, the device 170 is not configured with source or object code for the services. In other words, the device 170 would not have applications for services, such as e-mail, instant messaging, video, chat, text messaging, or push to talk built into the device 170. Thus, distributing the code for the services to services aggregator 120 and content aggregator 130 reduces the developmental costs and complexity of device 170.

The device 170 may include a wireless communication radio and a simplified chip set for generating requests and displaying the content received in response to the requests. The communication interface of device 170 may be configured to connect to the communication network 110. The communication interface may a wireless interface that is WIMAX enabled. The communication interface transmits requests that identify device events, such as a pressed button or an expired timer to the services aggregator 120. The device events are sent to the services aggregator 120 for further processing and implementation by content aggregator 130. The communication interface of device 170 is also configured to process requests for opening new communication sessions for receiving additional content. In certain embodiments, the device 170 may include a GPS sensor to include coordinate information in the requests sent to the services aggregator 120. Additionally, the device 170 includes a display area for the user to interact with the device 170 and to view the content received by device 170. In some embodiments, the display area is both an input and output component for device 170. In other embodiments, the device 170 is configured with separate input components and output components, i.e., keyboard and display, respectively.

In response to user requests, the device 170 may receive screen graphics for the content, temporary logic—such as small applications—and other data that is stored by the device 170 from the content aggregator 130. The temporary logic is stored for a short time frame and may be utilized during a specified communication session. After the communication session is complete, the temporary logic is removed from the device 170. In certain embodiments, the temporary logic may generate key mappings for the content received by the device 170. The device 170 may utilize the temporary logic to reconfigure the input component of the device 170 to traverse the content received from the content aggregator. For instance, the device may load the temporary logic to trigger a key mapping generator 171 to alter functions for input component, i.e., keyboard, based on the content received by the device 170. The key mapping generator 171 generates mappings that enables the user of the device 170 to interact with different types of content. In some embodiments, the device 170 may be configured with a touch screen display that is configured as an input component, which enables the device 170 to switch between the different types of content based on the key mappings. In some embodiments, when the device 170 is displaying more that one type of content simultaneously, a display focus selector 172 is triggered to allow the user to switch between portions of the display area associated with the different types of content and the key mappings corresponding to the different types of content. For instance, when the device 170 simultaneously renders video and email content, the user may touch a portion of the display area to interact with the video content and touch a remaining portion of the display area to interact with the email content. When the user touches the different portions of the display area, the corresponding key mappings are loaded and utilized by the device 170 to generate the requests. The display focus selector 172 allows the device 170 to assign a key mapping for the display areas that render different types of content simultaneously. In certain embodiments, the temporary logic that triggers the key mapping generator 171 may be received from the service aggregator 120 after the content aggregator 130 combines two different types of content for transmission to the device 170. Once the appropriate key mapping is loaded, the device 170 may send requests, which identifies portion of the display area and content that a device event is directed to, to the services aggregator 120. The services aggregator 120 receives the requests and parses the requests to implement the device events via the content aggregator 130 and the authorized providers 150 associated with the device 170.

Thus, the key mappings provided by the key mapping generator 171 may allow the keys on the device to interact with different types of content, i.e., email and video, simultaneously or individually. The keys may provide email functionality, such traversing individual emails and composing functions, when interacting with email content. Moreover, the keys may provide video functionality, such as play, stop, and rewind, when interacting with video. The display focus selector 172 allows the device 170 to switch between different key mappings when the display area is utilized to simultaneously render different types of content.

One of ordinary skill in the art appreciates and understands that the exemplary operating environment 100 has been simplified and that alternate arrangements fall within the scope and spirit of the above description.

In an embodiment of the present invention, the services aggregator and content aggregator enable distributed delivery of content to a device connected to a communication network. When the device is rendering content received in response to a previous request, the device may issue a subsequent request for additional content. The services aggregator and content aggregator are employed to process the previous and subsequent requests. In certain embodiments, the content delivered to the device is a combination of the previously requested content and the additional content.

Figure 2:
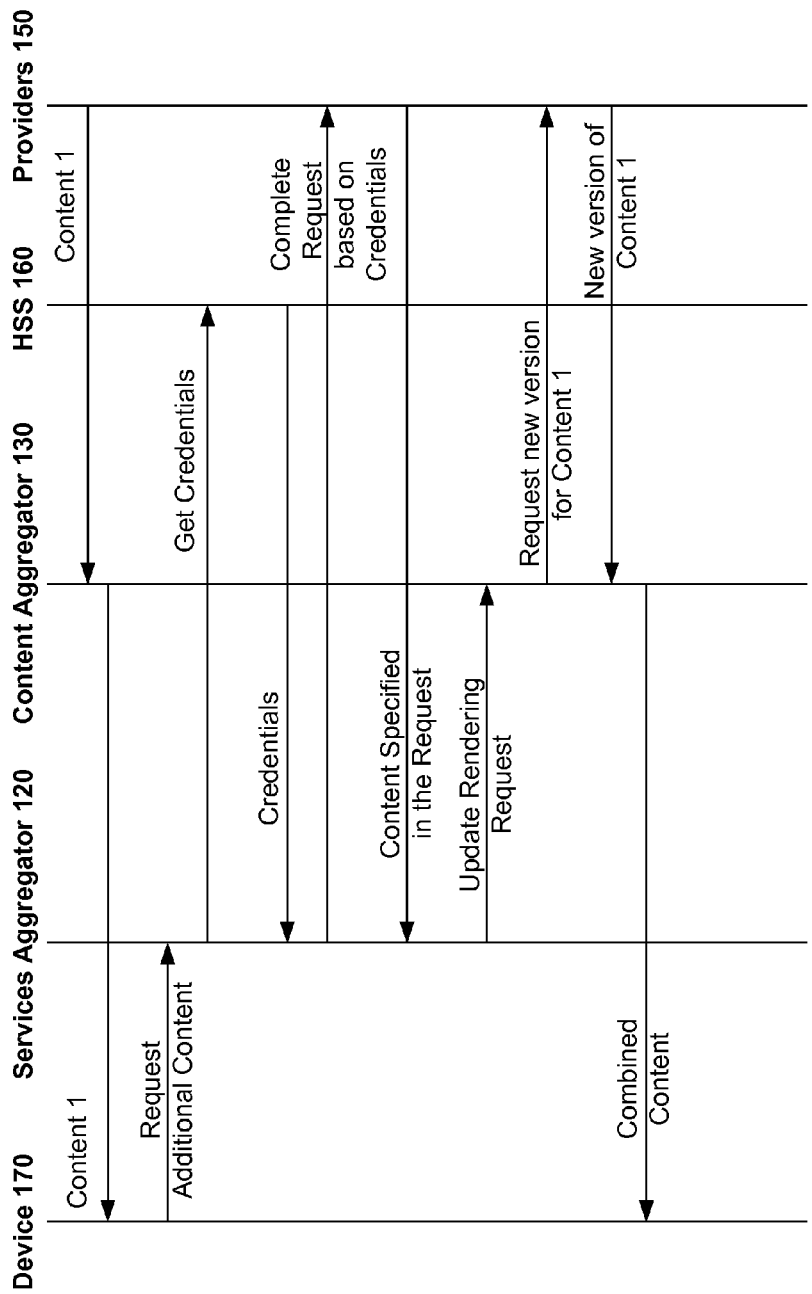
FIG. 2 is a communication diagram that illustrates the packets generated when delivering content in the exemplary operating environment of FIG. 1, according to an embodiment of the present invention.

FIG. 2 is a communication diagram that illustrates the packets generated when delivering content in exemplary operating environment 100 of FIG. 1, according to an embodiment of the present invention. Providers 150 generate a "content 1" packet that includes content that matches a previous request of device 170 received by the services aggregator 120. In certain embodiments, the "content 1" packet may include email content. The "content 1" packet is transmitted from the providers 150 to the content aggregator 130, which processes the "content 1" packet to format the content for presentation on the device 170. While receiving the "content 1" packet, the device 170 may generate a "request" packet for additional content, such as an updated version of content 1 or different content, i.e., video content. This subsequent request for additional content is encapsulated in a "request" packet by the device 170 and transmitted to the services aggregator 120 for further processing. The service aggregator 120 receives the "request" packet and parses the "request" packet to create a query for the HSS 160. The services aggregator 120 utilizes the extracted information from the "request" packet to generate a "get credentials" packet. The "get credentials" packet may specify the device type or user identifiers. The HSS 160 receives the "get credentials" packet and responds with a "credentials" packet that includes the credentials associated with the device 170 or the user of device 170. The "credentials" packet may include authentication information and provider location information. The services aggregator 120 receives the "credentials" packet and utilizes the authentication information and provider location information to generate a "complete request" packet, which is transmitted to the providers 150 to obtain the content specified in the "request" packet received from device 170. The providers 150 process the "complete request" packet to locate the additional content that the device 170 requested. The additional content is encapsulated in a "content specified" packet. In turn, the providers 150 transmit the "content specified" packet to the services aggregator 120. The services aggregator 120 receives the "content specified" packet and extracts the additional content. Based on the additional content and the content that was previously requested, the services aggregator 120 identifies positions and sizes for presenting the additional content and the content that was previously requested by device 170. In some embodiments, the services aggregator 120 encapsulates and transmits the additional content, the positions, and the sizes in an "update rendering" packet to the content aggregator 130. The content aggregator 130 receives the "update rendering" packet and formats the additional content and the content that was previously requested by device 170 based on the size and position included in the "update rendering" packet. The content aggregator 130 may perform rendering transformations directly on the additional content or the content that was previously requested to size and position the additional content and the content that was previously requested. After the transformations are performed, the transformed additional content and transformed content that was previously requested are encapsulated in a "combined content" packet and transmitted to device 170. Alternatively, rather than having the content aggregator 130 perform transformations on the content previously requested by device 170 or on the additional content, the content aggregator 130 generates a "request new version" packet. The "request new version" packet specifies the size, the position, and the resolution for the content previously requested by device 170 or the additional content. The "request new version" packet is transmitted to the providers 150. In turn, the providers 150 locate the new versions of the content that was previously requested by device 170 or new versions of the additional content and encapsulates the new versions in a "new version" packet, which is transmitted to the content aggregator 130. In one embodiment, the content aggregator 130 processes the "new version" packet and combines the new versions of the content previously requested by device 170 with the additional content in the "combined content" packet. In an alternative embodiment, the content aggregator 130 processes the "new version" packet and combines the new version of the additional content with the content that was previously requested by device 170 in the "combined content" packet. In turn, the "combined content" packet is transmitted from the content aggregator 130 to the device 170 for display.

Accordingly, embodiments of the present invention simultaneously displays different types of content requested by a device. The device utilizes the services aggregator and content aggregator to locate content that matches the request and to format the content for simultaneous rendering on the display of the device.

In another embodiment, the device is configured to simultaneously interact with different types of content. The device may generate key mappings that are associated with the different types of content received for simultaneous rendering. The device may switch between key mappings to interact with the different types of content.

Figure 3:
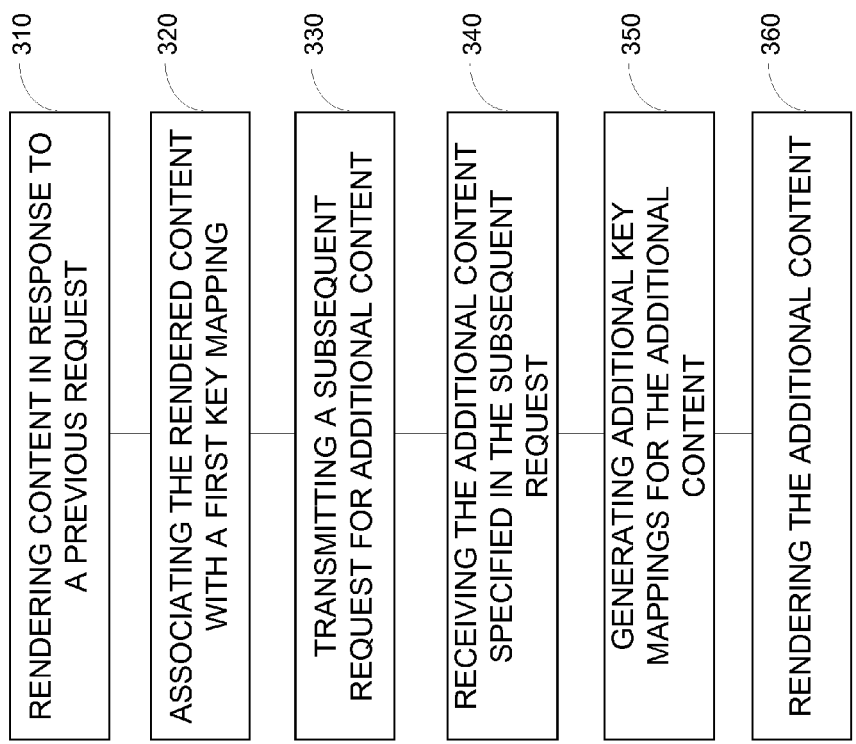
FIG. 3 is a logic diagram that illustrates a method to request content over a communication network, according to an embodiment of the present invention.

FIG. 3 is a logic diagram that illustrates a method to request content over a communication network, according to an embodiment of the present invention. In operation 310, the device renders content in response to a previous request. In operation 320, the device generates a key mapping for the rendered content and associates the key mapping with the rendered content. The device generates a subsequent request for additional content, in operation 330. In turn, the device receives the additional content in operation 340. The device generates additional key mappings for the additional content and associates the additional key mappings with the additional content, in operation 350. In operation 360, the additional content is rendered. The additional content and previously requested content may be rendered simultaneously and the first and additional key mappings may be utilized to interact with the additional content and the previously requested content based on a selected display focus for the device.

In another embodiment, the services aggregator and content aggregator process the requests for content received from a device. In response to the requests, providers are queried to locate content that match the content specified in the requests. The matching content is sent from the providers to services aggregator and content aggregator for further processing. The services aggregator generates scale and position information for the matching content, and the and content aggregator formats the matching content for rendering on the device.

Figure 4:
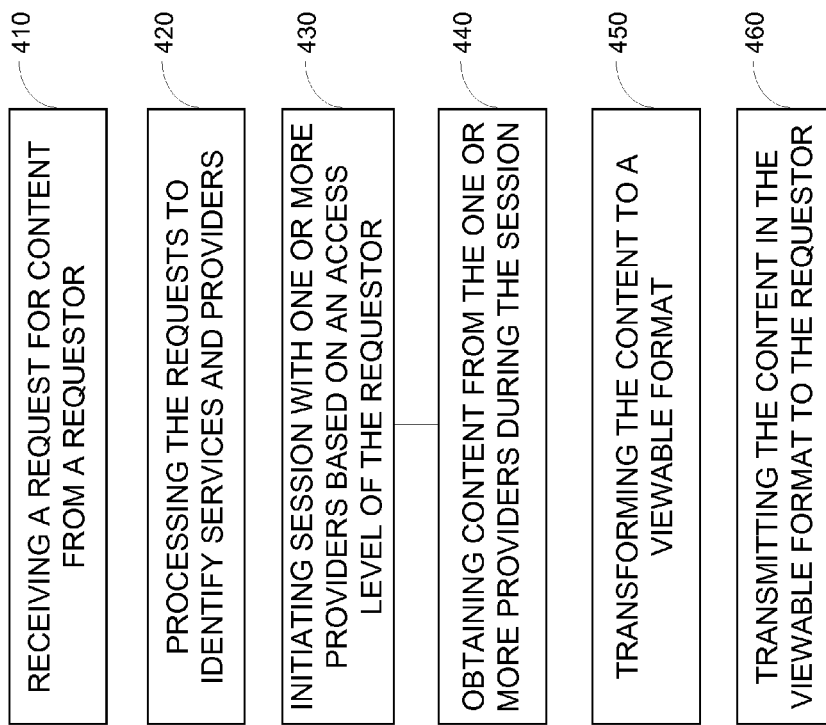
FIG. 4 is a logic diagram that illustrates a method to deliver content over a communication network, according to an embodiment of the present invention.

FIG. 4 is a logic diagram that illustrates a method to deliver content over a communication network, according to an embodiment of the present invention. In operation 410, a request for content is received by the services aggregator from a requestor. In operation 420, the request is processed by the services aggregator to identify services, content, and providers of the content based on the device that generated the request. The services aggregator initiates a communication session with the identified providers based on an access level associated with the request, in operation 430. In turn, content identified in the request is obtained from the providers, in operation 440. In operation 450, the content aggregator transforms the content obtained from the providers into a viewable format based on, among other things, scale and position information calculated by the services aggregator. In operation 460, the content in the viewable format is transmitted to the requestor.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all operations listed in the various figures need be carried out in the specific order described.

The invention claimed is:

1. One or more non-transitory computer-storage media having computer-useable instructions embodied thereon for performing a method for delivering content to a device over a communication network, the method comprising:
receiving requests for content from a requestor;
processing the requests to identify services and providers associated with the services and content, wherein the requestor is a wireless device that lacks the source or object code associated with the identified one or more services;
receiving credential information corresponding to the requestor from a source remote to the requestor;
authenticating the credentials at one or more providers;
opening communication sessions with the authenticated one or more providers based on device constraints included in the credential information;
obtaining content from the one or more providers during the session;
selecting display positions for the obtained content based on types of content included in the obtained content;
transforming content to a viewable format; and
transmitting the content in the viewable format to the requestor over the communication network.

2. The media of claim 1, further comprising
identifying a scale for a display area associated with the requestor and a connection speed associated with the requestor; and
sizing the content based on the scale and connection speed.

3. The media of claim 2, wherein a home serving system stores the credentials that allows the user to authenticate at the one or more providers.

4. The media of claim 1, wherein the content in the viewable format is a combination of content having different formats.

5. The media of claim 1, wherein the wireless device is a WIMAX-enabled device.

6. The media of claim 1, wherein some services are legacy services and some services are next-generation services implemented on the communication network instead of the device.

7. A distributed delivery system for delivering content associated with one or more applications, the distributed delivery system comprising:
- devices to generate requests for content;
- a services aggregator to process the requests, to identify credentials associated with the devices, to identify providers associated with the devices, and to generate sessions with the providers; and
- a content aggregator to receive content from the providers and to transform the content based on a scale of a display area associated with the devices, wherein a key logic on the devices is altered based on the content transmitted from the content aggregator to the devices.

8. The distributed delivery system of claim 7, wherein the services aggregator caches credentials associated with each device that generated the requests for content.

9. The distributed delivery system of claim 7, wherein the content aggregator stores content associated with requests generated by the devices.

10. The distributed delivery system of claim 7, wherein the device is one of a mobile phone, a laptop, a personal digital assistant, or a media player.

11. The distributed delivery system of claim 7, wherein the services aggregator provides access to a collection of services.

\* \* \* \* \*